United States Patent [19]

Donado et al.

[11] Patent Number: 5,229,221
[45] Date of Patent: Jul. 20, 1993

[54] METHODS OF MAKING ANODES FOR HIGH TEMPERATURE FUEL CELLS

[75] Inventors: Rafael A. Donado; Estela T. Ong, both of Chicago, Ill.

[73] Assignee: Electric Power Research Institute, Inc., Palo Alto, Calif.

[21] Appl. No.: 870,605

[22] Filed: Apr. 16, 1992

[51] Int. Cl.⁵ .......................... H01M 4/88; C21D 1/00
[52] U.S. Cl. ......................................... 429/13; 429/45; 419/29; 419/56
[58] Field of Search ........................ 429/13, 12, 45, 44, 429/40; 427/115; 419/1, 19, 26, 29, 38, 56-58, 60, 2, 10

[56]  References Cited
U.S. PATENT DOCUMENTS

| | | | |
|---|---|---|---|
| 3,350,200 | 10/1967 | Sandstede et al. | 419/26 X |
| 3,397,968 | 8/1968 | Lavendel et al. | 419/2 X |
| 4,247,604 | 1/1981 | Marianowski et al. | 429/40 |
| 4,752,500 | 6/1988 | Donado | 429/44 X |
| 4,772,449 | 9/1988 | Bones et al. | 419/19 X |

*Primary Examiner*—Anthony Skapars
*Attorney, Agent, or Firm*—Hughes & Multer

[57] ABSTRACT

Methods of fabricating anodes for high temperature fuel cell in which an alloy powder with a major phase of a base metal and a minor phase of a stabilizing, alloying metal is preformed into the shape wanted in the anode. This green structure is sintered under conditions which produce a metallic, essentially oxygen-free structure. The sintered structure is selectively oxidized in situ in a fuel cell under conditions which promote internal oxidation and a consequent increase in the stability of the anode under operating conditions where the anode is exposed to high temperatures for long periods of time.

5 Claims, 6 Drawing Sheets

METHODS OF MAKING ANODES FOR HIGH TEMPERATURE FUEL CELLS

TECHNICAL FIELD OF THE INVENTION

The present invention relates to novel, improved methods of fabricating anodes for high temperature fuel cells.

BACKGROUND OF THE INVENTION

Fuel cells were invented in 1839 by Sir William Grove. A fuel cell is an electrochemical device which directly combines a fuel and an oxidant such as hydrogen and oxygen to produce electricity and water. It has an anode and a cathode separated by an electrolyte. Hydrogen is oxidized to hydrated protons on the anode with an accompanying release of electrons. At the anode, oxygen reacts with protons to form water, consuming electrons in the process. Electrons flow from the anode to the cathode through an external load, and the circuit is completed by ionic current transport through the electrolyte.

Fuel cells do not pollute the environment. They operate quietly, and high temperature fuel cells have a potential efficiency of ca. 80 percent. Virtually any natural or synthetic fuel from which hydrogen can be extracted—by steam reforming, for example—can be employed.

As suggested above, the anode is a major component of a high temperature fuel cell, and a successful fuel cell of that character which will remain stable when heated at high temperatures for long periods of time—for example, at the 500–750° C. operating temperatures and in the corrosive environment of molten carbonate fuel cells.

Anodes for high temperature fuel cells are typically based on nickel although other metals have been proposed. These are principally cobalt (which is of limited practicality because of its posture as a strategic metal) and copper (see U.S. Pat. No. 4,752,500 issued Jun. 21, 1988 to Donado for PROCESS FOR PRODUCING STABILIZED MOLTEN CARBONATE FUEL CELL POROUS ANODES).

The base metals suitable for high temperature fuel cell anodes undergo sintering at the temperatures to which the anodes of high temperature fuel cells are subjected. As a result, the anode, which is required to be porous, consolidates with use; and the pores close, causing countless problems. This consolidation occurs because of the reducing atmosphere, compressive load, and temperatures utilized in molten carbonate and other high temperature fuel cell processes. Furthermore, the stack of anodes in the cell bundle gets thinner and thinner with use. This results in pore closure which causes gaps in the stack and with resulting lapses in electronic and ionic communication through the stack and a consequent reduction in operating efficiency.

Other potential microstructural instability mechanisms in a porous anode under cell operating conditions are:

Compressive Creep—Particles are drawn closer together as the metal yields under load.

Particle Rearrangement—Large pores collapse as the particles rearrange via grain boundary sliding under compressive load.

Additives have been employed in an effort to stabilize nickel-based anodes intended for high temperature fuel cells. One commonly suggested stabilizing additive for nickel in fuel cell anodes is chromium.

Currently state-of-the-art are Ni-Cr anodes fabricated by: blending Ni and Cr powders, forming the mixture into a sheet form, and sintering the sheet into a coherent, porous, green structure. The green structure is installed directly in the fuel cell in which the anode is to be used; the fuel cell is brought to operating temperature; and fuel and oxidant are introduced into the cell. The Cr constituent of the anode thereupon oxidizes and forms $Cr_2O_3$ and $LiCrO_2$ on the surface of the nickel base metal.

External oxides have only a limited ability to inhibit anode creep. Consequently creep of unacceptable magnitude is a continuing problem, even in state-of-the-art Ni-Cr anodes.

Nickel-aluminum fell cell anodes in which the aluminum is employed to stabilize the nickel base metal have also been proposed by a number of investigators, but their efforts to date have met with only limited success.

In any event, it has been found that internal oxidation of the alloying element (Cr or Al in nickel) is necessary to obtain a creep resistant anode. Internal oxidation of a fuel cell anode is a prolonged process because it involves solid state diffusion of oxygen in nickel at a controlled temperature and atmosphere. For example, in one investigation where the anode composition was Ni+Cr, the internal oxidation step was carried by heating the anode structure at 600°–800° C. for 24 hours in an atmosphere containing 80–100 volumes of steam to one volume hydrogen.

Also, to obtain a structure with the requisite porosity, Ni-Al fuel cell anodes are generally prepared by sintering a mixture of nickel and aluminum powders. However, nickel and aluminum powder mixtures do not readily form alloys when heated because Al oxidizes in normal reducing atmospheres employed in sintering processes. Therefore, it is difficult a to fabricate Ni-Al anode from Ni and Al powders. Moreover, if one starts with a pre-alloyed Ni-Al powder, sintering of the powder into a coherent structure is also difficult in normal reducing atmospheres because the gas usually contains a residual oxygen that readily oxidizes the Al phase, and the oxide product inhibits powder sintering. The problem described in the preceding paragraph has resulted in the development of a multi-step process designed to produce a usable Ni-Al fuel cell anode. In that process, Ni-Al powder is oxidized under controlled conditions such that the surfaces of the resulting particles are NiO powder and the interiors consists of aluminum oxide and metallic nickel. By then heat treating the oxidized powder in a reducing atmosphere, the NiO is reduced; and the particles are sintered together.

This process is undesirably complex. And it is expensive and time-consuming. For example, in an investigation where the anode composition was Ni+Al, the oxidation step was performed in an oxygen-containing atmosphere at 700°–1000° C. for 1–10 hours to oxidize both the Ni and Al. Afterwards, the Ni phase had to be reduced back to metal in a hydrogen-containing atmosphere at 600°–1000° C. for 0.5–2.0 hours.

SUMMARY OF THE INVENTION

It has now been discovered that the foregoing and other drawbacks of previously proposed methods for fabricating high temperature fuel cell anodes can be overcome to an acceptable extent by a novel process in which a powder alloy of a base metal and a stabilizing metal is preformed into the wanted anode shape and in which the resulting green structure is sintered in an environment which discourages oxidation of the alloying or stabilizing phase. This produces a metallic structure which, among others, has the advantage that it is not brittle like pre-oxidized anodes typically are.

The unoxidized structure is installed directly in the high temperature fuel cell in which it is to be employed and selectively oxidized in a manner which results in internal oxidation—that is, oxidation of the alloying or stabilizing phase and dispersion of the oxide particles within the particles of the base metal and at grain boundaries. The internally dispersed oxide particles effectively inhibit creep deformation of the anode by impeding the movement of those dislocations which cause creep deformation. They also effectively inhibit degradative particle growth by sintering of the base metal phase of the alloy from which the anode is fabricated. The tiny oxide particles at the grain boundaries restrict the unwanted particle rearrangement that would otherwise result from grain boundary sliding.

Internal oxidation parameters that are taken into account in treating the metallic, green anode structure are:
 alloy content of the starting powder;
 partial pressure of the oxygen in the oxidizing, fuel cell environment;
 oxidation temperature;
 alloying phase solubility in the base metal;
 diffusion coefficients of the alloying phase and oxygen in the base metal;
 free energy of formation of the oxide phase; and
 microstructure of starting alloy powder.

These parameters are not independent. Consequently, it may be most expeditious to empirically develop an appropriate or optimum set of parameters for a given application of the principles of the invention.

From the foregoing, it will be apparent to the reader that one important and primary object of the present invention resides in the provision of novel, improved anodes for high temperature fuel cells.

A related, also important and primary object of the invention resides in the provision of methods for fabricating anodes as characterized in the preceding object.

Other important objects of the invention, as well as additional advantages and features, will be apparent to the reader from the foregoing and the appended claims and as the ensuing detailed description and discussion proceeds in conjunction with the accompanying drawings.

DETAILED DESCRIPTION OF THE INVENTION

As discussed above, the starting material for the novel, herein disclosed method of fabricating a high temperature fuel cell anode is an alloy powder containing a major proportion of a base metal and a minor proportion of a stabilizing or alloying metal.

Suitable base metals, taking affordability into account, are: nickel, copper and cobalt. As a practical matter, cobalt may be an inferior choice because of its position as a strategic metal; and the creep of copper at the operating temperature of a high temperature fuel cell such as a MCFC—typically 650° C.—poses a formidable problem. Therefore, nickel will probably most often be the preferred metal.

Characteristics taken into account in selecting an alloy for stabilizing the microstructure of the base metal at the high, prolonged temperatures experienced by fuel cell anodes are their solubility in the base metal and their oxide stability, mechanical properties, availability, cost, ease of alloying with the base metal, and—in the case of a MCFC—their stability in carbonate melts. Suitable alloying metals, based on the foregoing criteria, are: aluminum, chromium, titanium, iron, silicon, beryllium, yttrium, and thorium with aluminum, titanium, and chromium being preferred.

At least in the case of nickel-based anodes, aluminum may typically prove to be the stabilizing element of choice. This metal is available at relatively low cost, and techniques for making Ni-Al alloy powders and for fabricating components from such alloy powders are well understood.

Aluminum may be employed in the alloy in amounts ranging from 0.1 to five percent based on the total weight of the alloy in those applications of the invention employing nickel as the base alloy. Appropriate amounts of the stabilizing element for alloys based on other metals can range up to 12 percent.

Figure 9:
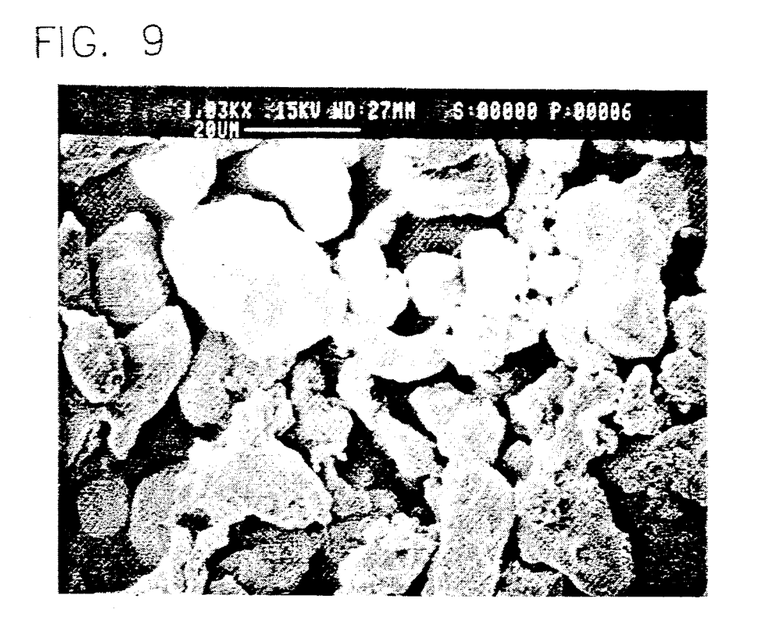
FIG. 9 is a 1000× photomicrograph of an alloy powder like that from which the specimen shown in FIGS. 1-4 was prepared except for a higher proportion of the alloying element employed to stabilize the base material.

An anode forming, nickel plus 3 percent aluminum powder is shown in FIG. 9. The particles were smooth, approximately spherical, and in a desirable 10 to 40 micron size range. The powder was easily sintered.

Figure 7:
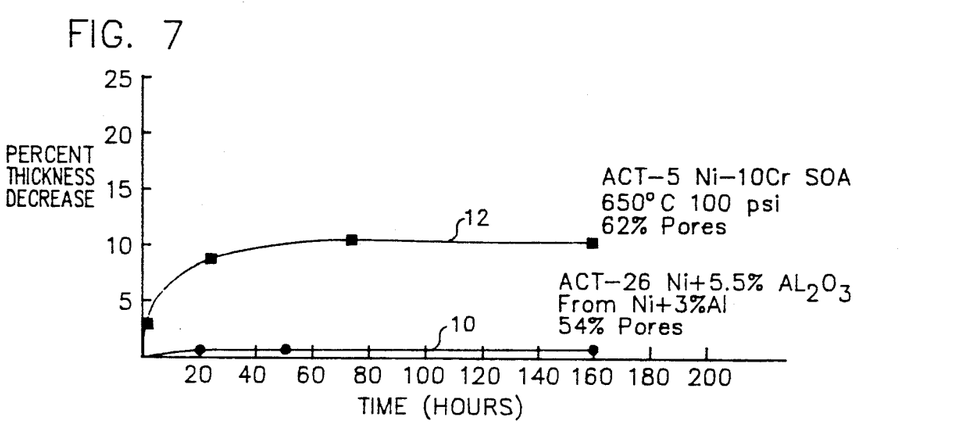
FIG. 7 is a graph showing the dramatically increased creep resistance that can be obtained by internally oxidizing a high temperature fuel cell anode alloy in accord with the principles of the present invention.

An internally oxidized anode made from this powder had an acceptable degree of porosity and a good creep resistance (<1% creep in 140 hours at 100 psi and 650° C.). The creep curve of the structure is shown in FIG. 7 and identified by reference character 10.

The anode of the present invention with the creep resistance shown by curve 10 was significantly superior in this respect to a state-of-the-art Ni-Cr anode operated under the same conditions as can readily be seen by a comparison of curve 10 with the creep resistance curve 12 for the state-of-the-art anode.

The preforming of the selected alloy powder into a green anode structure of the required shape is straightforward. One preferred technique is tape casting. In this process, the alloy powder is suspended in a liquid vehicle containing a solvent which can be an aqueous or organic liquid or a mixture of both aqueous and organic liquids; a plastic binder such as a methyl cellulose, polyvinyl alcohol, or an acrylic; and other additives such as plasticizers, dispersants, anti-foaming agents, etc. This produces a slurry which is cast into a thin sheet by tape casting on a flat substrate using a doctor blade. The tape is dried, leaving powder material held together by the plastic binder.

Alternatively, alloy powder can be placed in a flat graphite mold and compacted by the application of pressure.

In both the graphite mold and tape casting processes, very little pressure (if any) will typically be required to form the powder into the wanted shape. However, pressures of up to 2000 psi can be applied to the mold-contained powder or the cast tape as appropriate to keep the porosity of the anode structure at a maximum of 65 percent.

Irrespective of whether the molding or tape casting approach is employed, the goal is a green structure with a thickness of 10–50 mils, preferably one with a thickness in the 20–40 mil range.

As was pointed out above, Ni and Al powder mixtures do not form alloys readily because Al oxidizes in normal reducing atmospheres. Therefore, it is difficult to fabricate a Ni-Al anode from Ni and Al powders. If one starts with a pre-alloyed Ni-Al powder, sintering into a coherent structure is also difficult in normal reducing atmospheres because the gas usually has residual oxygen that readily oxidizes the Al phase; and the oxide product inhibits powder sintering.

In anode fabricating processes employing the principles of the present invention, these problems are eliminated by sintering the green structure or preform made from the Ni-Al alloy powder in one heat treatment step at 1000° C. to 1200° C. in a controlled environment which is either pure dry H2, a dry inert gas (He or Ar), or a vacuum ($10^{-4}$ torr or lower). These sintering atmospheres inhibit the oxidation of the alloying phase. The resulting anode structure is consequently metallic and not brittle as typical of pre-oxidized anodes. This is a decided advantage as it facilitates the handling of the preform.

It has unexpectedly been discovered that a sintered anode structure fabricated as just described can be selectively oxidized in a manner which favors the wanted internal oxidation of the anode forming alloy by installing the anode directly in a fuel cell and effecting the selective oxidation of the anode in situ in the fuel cell. This is a significant advance in the art. The selective in situ oxidation of the sintered and directly assembled anode eliminates the long and expensive ex situ oxidation step heretofore employed to oxidize the alloying phase and thereby improve the creep resistance of state-of-the-art and other previously proposed high temperature fuel cell anodes.

In one representative application of the present invention, a tapelike anode 3.59 cm long by 1.26 cm wide by 29.3±2 mils thick over seven-eighths of its area and weighing 7.19 gm was fabricated by pressing a eutectic Ni-5Al powder resembling in appearance and particle size the Ni-Al powder shown in FIG. 9.

The green structure was sintered by: placing it in a furnace, heating the furnace to a temperature of 1000° C. over a period of five hours, holding the specimen at 1000° C. for two hours, and then allowing it to cool in the furnace to ambient temperature (the cooling step is not critical and may range from less than 30 minutes to as long as 10 hours depending on the characteristics of the particular furnace or oven being used).

Throughout this single step heat treatment, an inert atmosphere—i.e., one not favorable to oxidation of the Al stabilizing element—was maintained in the furnace. Specifically, hydrogen gas passed through Drierite to remove moisture and a filter or oxygen getter made of steel wool and placed in front of the anode structure was employed to remove residual oxygen from the gas.

The sintered structure was 3.54 cm long by 1.24 cm wide by ca. 28.88 mils thick (shrinkage of 1.42%×1.37%×1.5%). It weighed 7.14 gms (weight loss of 0.68%) and had a porosity of 57.06% (prior to oxidation of the Al alloying element).

Figure 1:
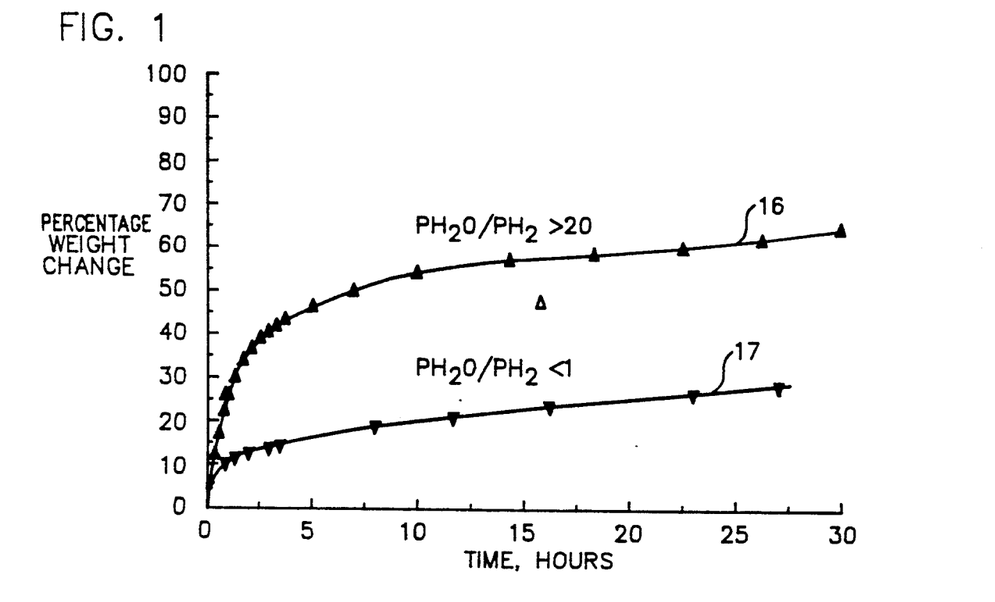
FIG. 1 is a 500× photomicrograph of a Ni-Al anode specimen sintered in an oxidation inhibiting atmosphere in accord with the principles of the present invention.
Figure 2:
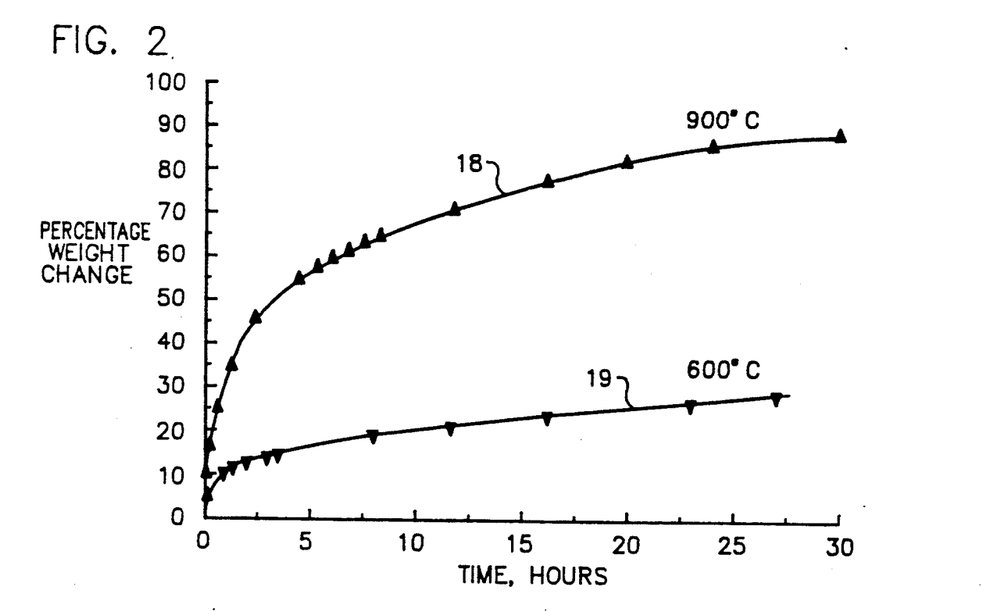
FIG. 2 is a 500× photomicrograph of the same specimen after it was subjected to selective oxidation in accord with the principles of the present invention to create an internal dispersion of oxidized alloying (or stabilizing) metal phase.

As shown in FIGS. 1 and 2, each grain of the sintered specimen had a smooth cross-section typical of a single-phase alloy composition.

Figure 8:
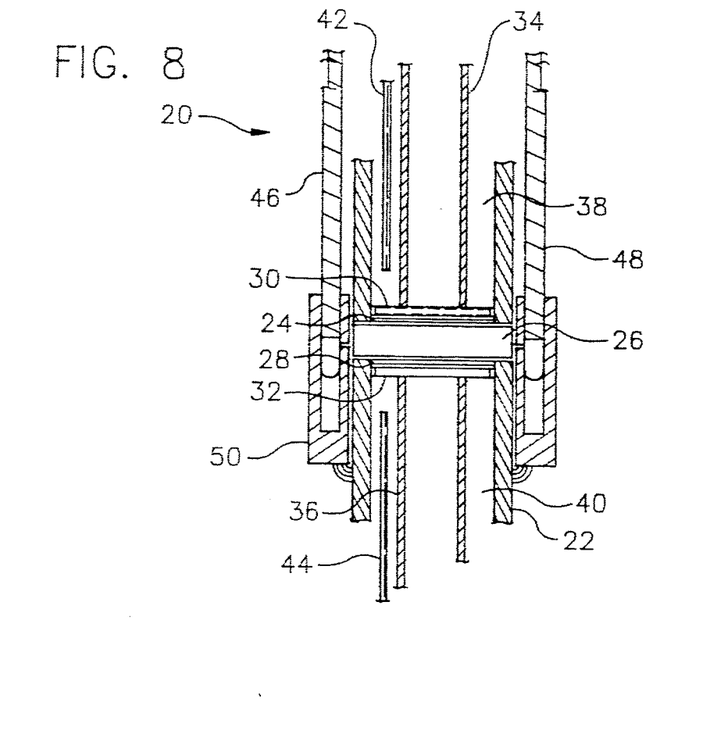
FIG. 8 is a primarily pictorial section through one high temperature, molten carbonate fuel cell in which sintered anode structures can be internally oxidized in situ in accord with the principles of the present invention.

Referring still to the drawings, FIG. 8 depicts a test cell 20 in which centered anode structures embodying the principles of the present invention can be selectively oxidized, and then evaluated.

Fuel cell 20 has an elongated, cylindrical casing 2 in which the anode (identified by reference character 24) is in a sandwich that also contains a tile 26 filled with a molten carbonate electrolyte, a cathode 28, and current collectors 30 and 32. A fuel and an oxidant are introduced into fuel cell 20 by way of axially aligned tubes 34 and 36 concentrically disposed in housing 22 on opposite sides of the anode-tile-cathode sandwich.

Effluent fuel is exhausted from fuel cell 20 through the annular passage 38 between fuel inlet tube 34 and fuel cell housing 22. Effluent oxidant is similarly discharged from the fuel cell through an annular passage 40 between housing 22 and oxidant inlet tube 36.

For purposes of evaluation, the effluent fuel and oxidant sampling tubes 42 and 44 are installed in the effluent fuel and oxidant exhaust passages 38 and 40, respectively; and reference electrodes 46 and 48 are supported from fuel cell housing 20 in an electrode holder 50.

Test cell has a 3 $cm^2$ active area, a 70-mil hot pressed tile with a molten carbonate electrolyte, a 15-mil in-situ oxidized NiO cathode, a 30 mil thick anode constructed in accord with the principles of the present invention, a perforated nickel anode current collector, and a perforated stainless steel current collector. The fuel was 60% $H_2$/40% $CO_2$ humidified to 20 percent, and the oxidant was 30% air/70% $CO_2$ humidified at room temperature. The utilization was kept at 15% for the oxidant and 6.7% for the fuel for a 200 mA/$cm^2$ current density.

The sintered anode structure was directly assembled in 3 $cm^2$ fuel cell 20 after sintering but prior to any oxidation of its stabilizing element. The cell test was then operated for 2000 hours, and the cell performance was rated as very good.

Figure 3:
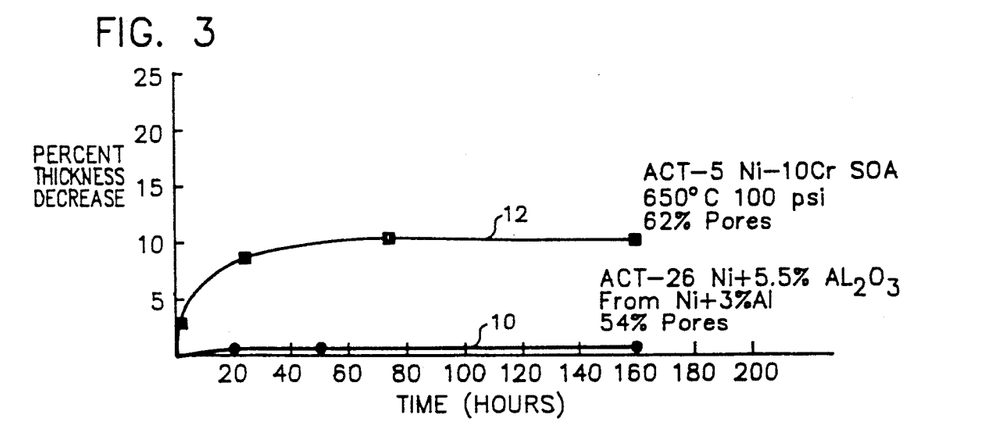
FIGS. 3 and 4 are 1000× photomicrographs of the specimen shown in FIGS. 1 and 2 at the same stages of the anode fabrication process.
Figure 4:
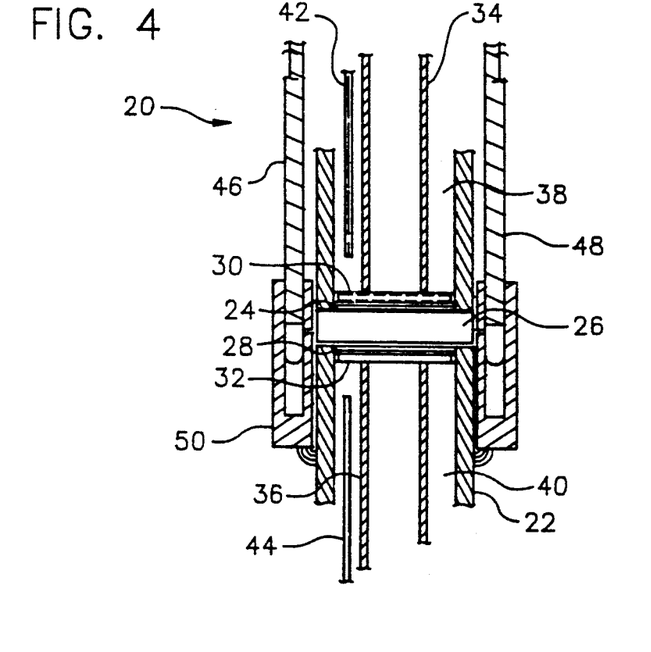

By comparing the micrographs of the anode cross-section before and after the foregoing operation of the fuel cell (FIGS. 1 and 3 vs. FIGS. 2 and 4), it can be seen that internal oxidation of the Al phase took place in the fuel cell. In the pre-test micrographs (FIGS. 1 and 3), each grain has a smooth cross-section typical of a single phase alloy composition. In the post-test sample (FIGS. 2 and 4), the grain cross-section appears porous. This is a result of Al oxidation within the grains of the anode alloy.

Figure 10:
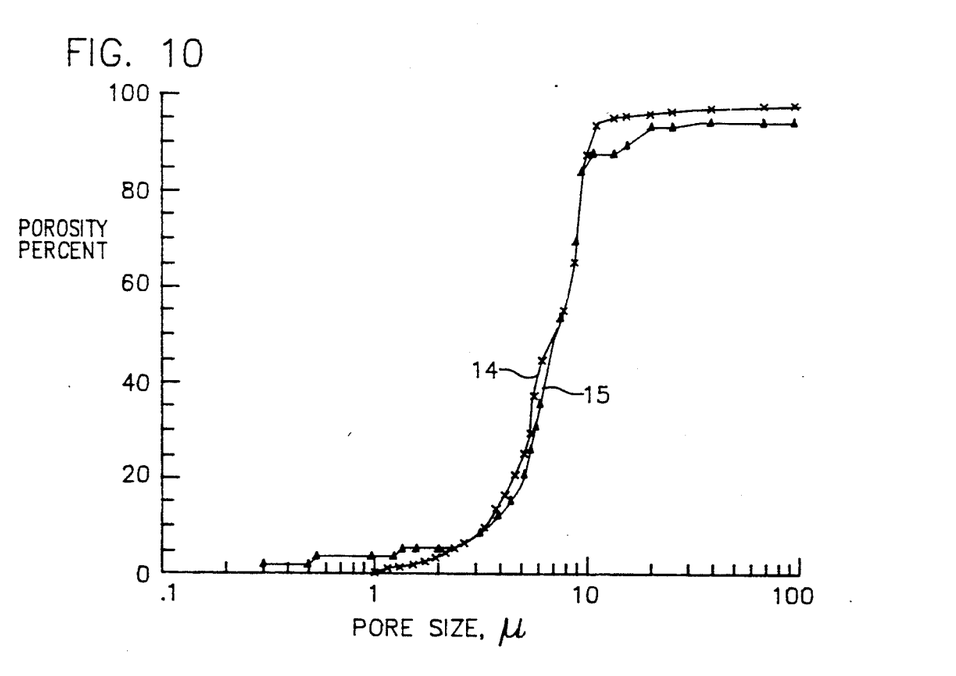
FIG. 10 is a graph showing that a anode which remains stable at high temperature can be fabricated by employing the principles of the present invention.

Curves 14 and 16 in FIG. 10 compare the pre and post-test pore-size distributions of an anode like that just described but with a 63% porosity and a mean pore size of 6.4 microns and fabricated from a Ni-3% Al powder alloy. The anode was internally oxidized in situ in fuel cell 20. The pore size distributions were similar. Thus, the FIG. 1 curves show that the pore structure of the oxide dispersion strengthened anode remained stable over the extended duration operation of the fuel cell.

It was pointed out above that a number of parameters affect the internal oxidation rate of a sintered, metallic anode structure internally oxidized in situ in a fuel cell in accord with the principles of the present invention. Of particular importance as far as the in situ oxidation step is concerned are temperature and the partial pressure of the oxygen in the anode environment.

Figure 5:
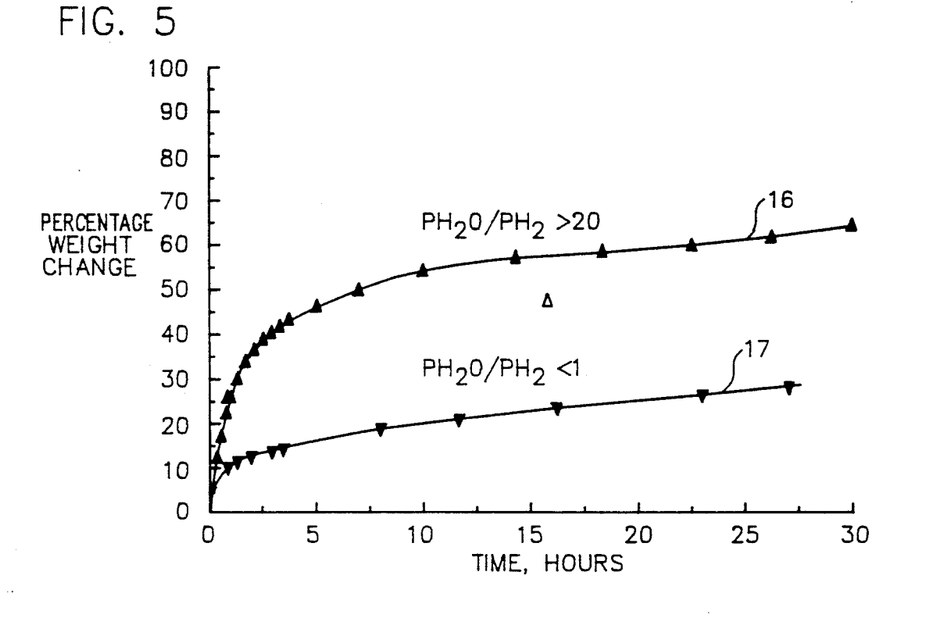
FIG. 5 is a graph showing the effect of the oxidizing atmosphere on the internal oxidation rate.

The effect of oxygen partial pressure $pO_2$ (indicated by $pH_2O/pH_2$) on the internal oxidation rate of the sintered Ni+3% Al anode structure is shown by curves 16 and 17 in FIG. 5. A high $pO_2$ is desired as this produces effective internal oxidation.

Figure 6:
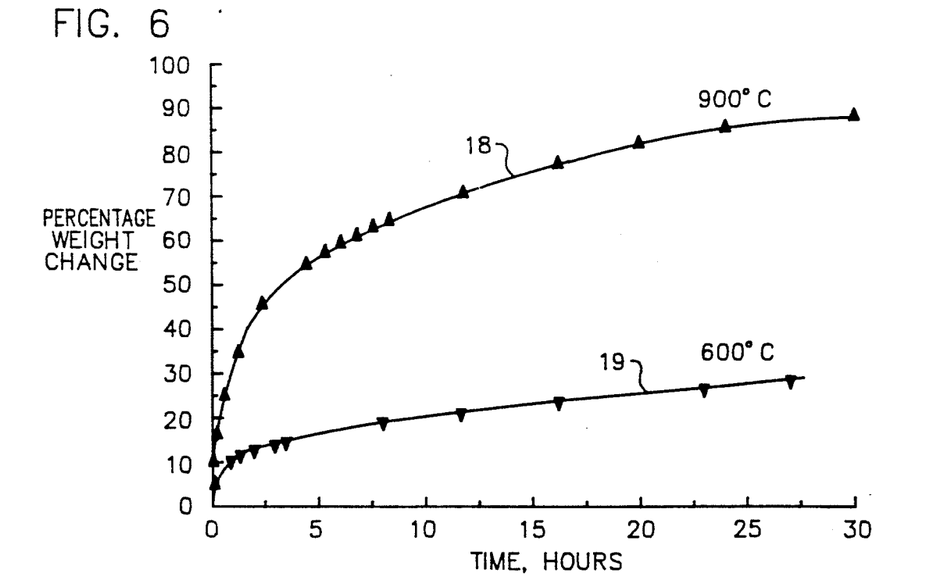
FIG. 6 is a graph showing the effect of time at temperature on the internal oxidation rate.

The effect of temperature on the oxidation rate of the Ni+3% Al anode structure is shown by curves 18 and 19 in FIG. 6. Although it is faster to oxidize at higher temperatures, one must ensure that external oxides are not formed excessively.

The invention may be embodied in many forms without departing from the spirit or essential characteristics of the invention. The embodiments disclosed herein are therefore to be considered in all respects as illustrative and not restrictive, the scope of the invention being indicated by the appended claims rather than by the foregoing description. All changes which come within the meaning and range of equivalency of the claims are therefore intended to be embraced therein.

We claim:

1. A method of preparing an anode for a high temperature fuel cell, said method comprising the steps of:
   forming an alloy powder from a base metal which is nickel, cobalt, or copper and an additive metal which is aluminum, titanium, iron, silicon, beryllium, yttrium, or thorium;
   forming the powder into the shape wanted in the anode; and
   sintering the resulting preform in a single heat-treating step into a coherent, metallic, essentially oxygen-free structure under conditions which prevent oxidation of the metals making up the alloy; and
   heat treating the sintered preform in a manner such that the additive metal is selectively oxidized and the resulting oxides(s) are internally dispersed within the base metal by installing the preform in, and then operating, the fuel cell.

2. A method as defined in claim 1 in which the alloy powder consists essentially of elemental nickel and elemental aluminum, the aluminum being present in an amount ranging from 0.1 to 5 percent.

3. A method as defined in claim 2 in which the preform is sintered at a temperature of 900°-1200° C.

4. A method as defined in claim 2 in which the preform is sintered in an atmosphere of pure dry hydrogen, under a vacuum of $10^{-4}$ torr or lower, or in an inert gas atmosphere.

5. A method as defined in claim 4 in which the inert gas is helium or argon.

* * * * *